Dec. 7, 1937.     O. J. OSTLIND     2,101,475
THERMAL CONTROL SWITCH
Filed Oct. 13, 1936
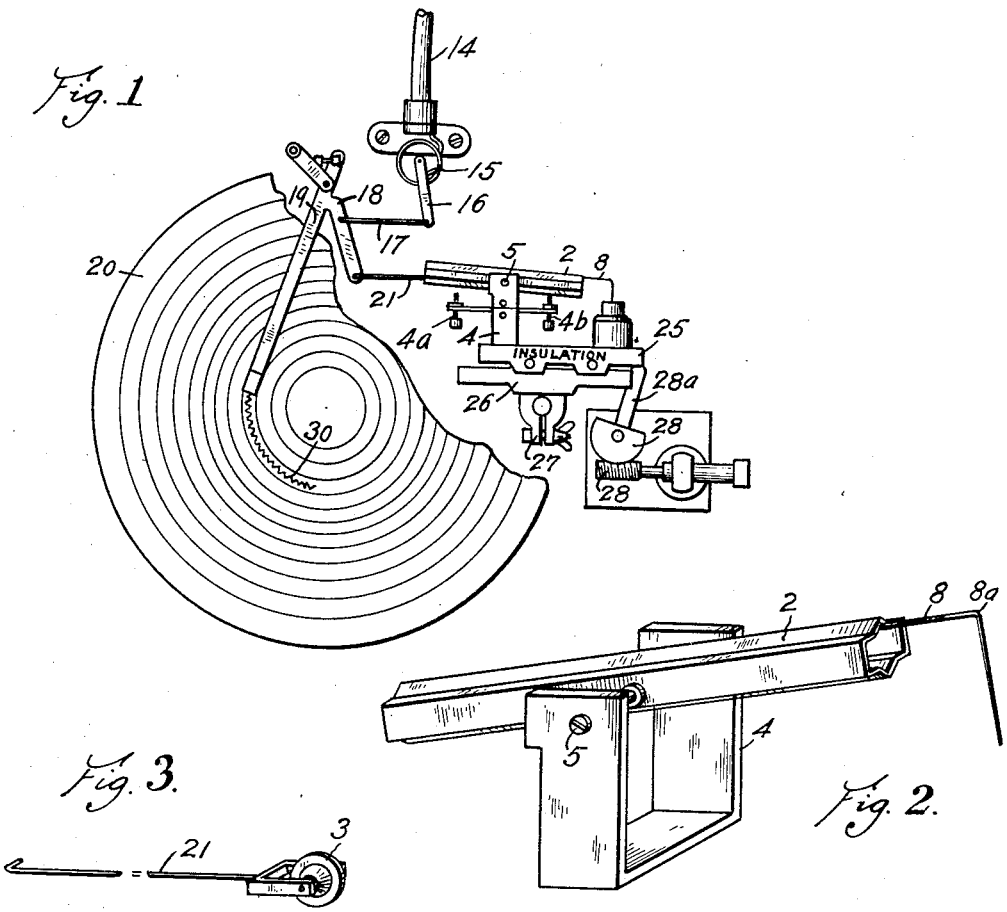
Fig. 1
Fig. 2
Fig. 3
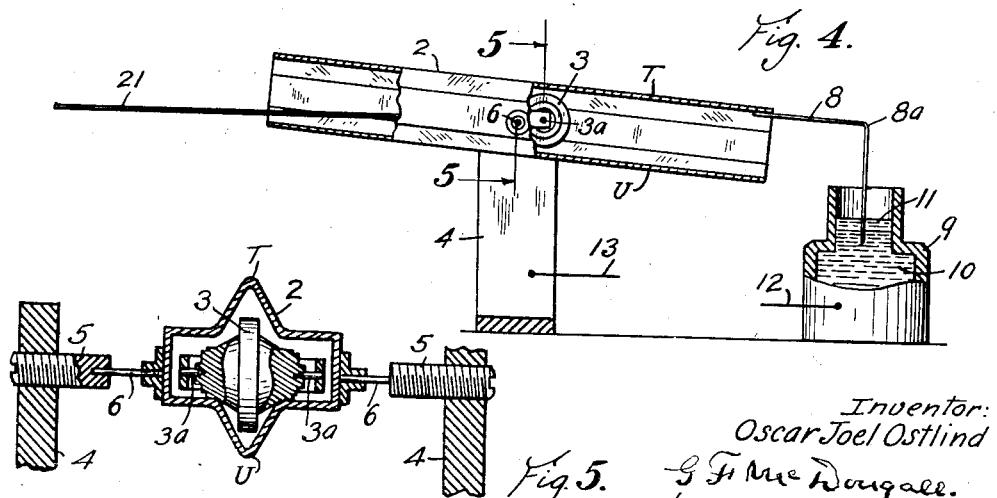
Fig. 4
Fig. 5
Inventor:
Oscar Joel Ostlind
by G. F. McDougall.
Attorney.

Patented Dec. 7, 1937

2,101,475

UNITED STATES PATENT OFFICE 2,101,475

THERMAL CONTROL SWITCH

Oscar Joel Ostlind, Portland, Oreg.

Application October 13, 1936, Serial No. 105,372

15 Claims. (Cl. 200—140)

This invention relates to heat sensitive control devices and in particular to thermostatic means for controlling heat apparatus suitable for maintaining a progressive heat control program over a definite period of time.

An object of the invention is an extremely sensitive thermostatically actuated switch, the range of which may be changed through a wide field without in any degree affecting its sensitivity.

Another object of the invention is the sensitive switch per se, that will make a positive movement, without chattering upon temperature changes at the source to be controlled as little as one degree Fahr.

Another object of the invention is a switch of extreme sensitivity, but in which movement is absolutely positive, accomplished by making the movable part of the switch apparatus top-heavy as to weight distribution, which function is improved by an underslung mounting.

Another highly important object of this invention is a switch mechanism in connection with a thermostat, in which the mechanical principle of adjustment may be described as that of moving the switch with respect to the travel of a thermostat to change the temperature range instead of changing the tension in the thermostat element itself, as is commonly done, the advantages of which will be hereinafter pointed out.

This apparatus is particularly adapted for use in controlling apparatus for the kiln drying of lumber, which due to the very large size of commercial dry kilns and the great amount of heating apparatus contained in them, is very unsteady unless the heating apparatus is controlled very minutely, without which type of control variations due to shutting off and turning on heat and/or humidity will run high above and well below a median line and a pendulum curve will be drawn on a chart by a recording device. This is especially true where the thermostat itself is adjusted to control temperature or humidity ranges, to the serious impairment of the drying schedule.

By my novel mechanical arrangement the thermostat is not required to overcome any springs, lift any weights or perform any external work of such magnitude that it will sensibly affect the smoothness of its temperature curve.

Thermostats are commonly operated by the expansive qualities of a metal or gas or other substance against the opposition of a spring. Such thermostats, if not adjusted while in use, will draw a definite curve recording the temperature that changes them, but if the temperature range of the instrument is changed by adjusting the tension of the spring against which the temperature of the expanding substance works, an entirely different curve will be drawn because sensitivity becomes less and less as the spring tension is increased, stiffening the spring.

My new apparatus avoids the difficulties hereinbefore encountered by changing the position of the apparatus affected by the thermostat instead of changing the thermostat itself, thus merely moving the critical point on the curve of temperature. This does not affect the sensitivity.

This difference is very important and permits the employment of an extremely sensitive switch, the sensitivity of which, or the sensitivity of the thermostat, not being affected in the slightest by changing the temperature range of a kiln or other heat control structure, through a very wide range.

I accomplish the objects enumerated and others which will be apparent to those skilled in the heat control art by the apparatus illustrated in the accompanying drawing in which,—

Fig. 1 is a front view of the apparatus in its simplest form;

Fig. 2 is an enlarged view of a part of the apparatus shown in Fig. 1 indicated by the numeral 2 which I have called a top-heavy underslung track;

Fig. 3 is a wheel or rolling weight pivotally mounted in a carrier and supplied with a reach-rod;

Fig. 4 shows a combination of the apparatus shown in Figs. 2 and 3 in connection with a mercury contact hereinafter more completely described; and Fig. 5 is a section at 5—5 of Fig. 4.

In the drawing, 2 is a pivotally mounted track made in the form of a tube, within which a wheel or rolling weight 3 is movable by heat sensitive apparatus to change the balance of the track 2.

A bracket 4, or other suitable means, supports pivots 5, within which are mounted axles 6, which are rigidly attached to the track 2, as indicated in Fig. 5.

It will be noted that the point of contact of the wheel 3 within the tube 2 is below the axis of the axles 6; or in other words that the tube is underslung but a preponderant portion of the weight of the tube 2 is disposed above the axles 6, so that the tube 2 is top-heavy as mounted.

It will be seen from Fig. 5 that the pivotal mountings 3a, of the wheel 3, when in assembly within the tube 2, have axes coincident with the pivots 5. This is important as when the tube 2 tips due to shifting of the rolling weight or wheel 3, the wheel 3 merely turns on its axis as the tube 2 tips, very materially decreasing the resistance to the tipping operation and without disturbance of the pen arm 19.

A whisker 8, is made rigid with one end of the tube 2 as shown in Fig. 4, and bent at right angles at 8a, and as the tube 2 tips on its pivots 5 due to movement of the wheel 3, the whisker 8 will move in and out of the vessel 9 which contains mercury 10, covered with a thin layer of oil 11, and will thus make and break an electrical contact since the terminal 12 and the terminal 13 are in the loop of an electric circuit of suitable voltage and amperage, which through relays according to the known art may control any type of heat regulating apparatus.

The pipe 14 in Fig. 1 is connected to an apparatus remote from the devices shown which may be either a wet or dry bulb thermometer or any other suitable device and carries the heat generated effect of such apparatus to the flattened helical tube 15 and causes it to coil or uncoil according to the temperature changes in the remotely controlled location of the heat sensitive apparatus such as a wet or dry bulb thermometer in the enclosure of a dry kiln.

Movement of the helical coil 15 is transmitted to the lever 16, which is made rigid therewith, and through the pivotally attached wire 17 moves the bellcrank 18, to one leg of which is attached a pen arm 19, for marking a record on a chart such as 20, and the other leg of which is connected to the reachrod 21, which moves the wheel or rolling weight backward and forward within the tube 2, past the point of its pivotal suspension at 5 and 6 to cause it to make and break electrical contact of the whisker 8 with the mercury 10, in the container 9.

It will be seen that the inner surface of the tube 2 which serves as a track for the wheel 3, will thus describe an arcuate movement when the wheel 3 passes the pivotal suspension point 5, and owing to the top-heavy characteristic of the tube 2 combined with the arcuate movement of the bottom portion of the tube 2, that the movement will be very abrupt and positive.

Theoretically, there would seem to be a point at which the track 2 would be in balance with the center of weight of the wheel 3, precisely in line with the axis 5 of the tube 2. Actually, however, this does not seem to be the case and it appears to be as positive as a snap-over switch.

The whisker 8 will remain in contact with the mercury 10, up to a given point and then any further movement, however slight, will break the contact entirely and tip the tube 2 through the range of movement afforded to it by the adjusting screws 4a and 4b.

For the interest of clarity in the drawing, the adjusting screws 4a and 4b are shown positioned to afford the track 2 a considerable movement, which would require the thermostat 15 to perform a sensible amount of work in lifting the wheel back and forth over the pivot 5. Actually the end of the whisker 8 need make a movement of only a sixteenth of an inch or less to make or break the electrical circuit owing to the minute current values employed, hence the external work done by the thermostat is not sufficient to cause an appreciable lag in its movement.

It will be noted that the helical coil 15, or thermostat, is not provided with any adjustment but has a fixed setting with respect to the vertical axis of the wheel or rolling weight 3, changeable of course as temperature changes, and that the temperature range according to Fig. 1 will be with the extremely small variation shown by the line 30 drawn by the pen 19; and to get any other temperature range such as adjacent any of the other concentric divisions of the chart 20, the pivot 5 is moved horizontally either to the right or the left (Fig. 1).

This is accomplished by mounting the switch apparatus upon an insulated carriage 25 which is suitably mounted on a bracket 26, which is adjustable for level by the clamp 27, and which may be moved to a very fine adjustment by the worm sector 28, the arm 28a and the manually operated worm 29.

Movement of the carriage 25 changes the temperature range through which the thermostatically controlled switch apparatus works without in any degree affecting its sensitivity.

The line drawn upon the chart 20 by the pen arm 19 will be proportionately much straighter than shown at 30 though under a magnifying glass it will show a waviness as indicated. This waviness has been exaggerated in the drawing and represents the pendulum effect of starting and stopping the heat generating or humidifying apparatus.

While the foregoing specification is in considerable detail, I do not wish to have it considered as limiting the scope of the invention which is more clearly set forth in the following claims.

I claim:

1. A sensitive switch comprising a centrally pivoted top-heavy track member for a wheel, a wheel movable axially of the track under the influence of temperature changes and a switch that is positioned to operate by movement of the track when pivotally tipped by movement of the wheel.

2. A sensitive switch comprising an underslung pivoted track member, an electrical contact device that makes and breaks upon pivotal movement of the track and a wheel bearing on the track that is movable by heat sensitive apparatus to pivot the track to open or close the electrical contact.

3. A heat sensitive switch control defined in part as a pivotally mounted track member and a wheel mounted for reciprocal movement on the track under the influence of heat sensitive devices, the track being underslung with respect to its pivotal mounting and made top-heavy by preponderant mass above the pivot.

4. Heat control apparatus defined in part as a pivot point that is movable by heat sensitive apparatus, a wheel member spaced from said pivot point by a reach-rod that is effective to throw a switch by disturbing the balance of said switch upon movement of the wheel by the reach-rod and a carriage for the switch that is movably mounted to change the position thereof and thereby change the temperature range of operation of the switch without adjusting said heat sensitive apparatus.

5. In heat control apparatus, a sensitive switch of the character described, a carriage upon which the switch is pivotally mounted and a thermostat controlled weight that is movable to turn the switch on its pivot to start or stop heat control mechanisms, the said carriage being movable to change the temperature range under which the switch operates.

6. In a sensitive switch of the character described, a pivoted underslung track, make and break electrical switch apparatus operable by pivotal movement of the track and a pivoted wheel movable over the track to pivot the same by influence of a thermostat.

7. In a sensitive switch of the character described, a pivoted underslung track, make and break electrical switch apparatus operable by pivotal movement of the track and a pivoted weight wheel that is movable over the track by a thermostatic means to pivot the same and operate the switch.

8. In a sensitive switch of the character described, a pivoted underslung track member, make and break electrical switch apparatus operable by pivotal movement of the track and a pivoted wheel movable over the track to pivot the same, the said wheel and the pivots of said track being arranged to be in horizontal alignment as the pivot of the wheel moves to vertical alignment with the pivot of the track.

9. In a sensitive switch of the character described, a pivoted underslung top-heavy track member, make and break electrical switch apparatus operable by pivotal movement of the track, a pivoted wheel that is arranged for temperature actuation to move reciprocably with reference to the pivot of the track, the pivots respectively of the wheel and the track being arranged to be nearly in axial alignment at the time the track is overbalanced to tip.

10. In heat control apparatus, a thermostat, a rolling weight that is movable over a track by the thermostat, linkage connecting the wheel of the thermostat, an underslung pivoted track, an electric switch that is operable by pivotal movement of the track induced by movement of the weight to one or the other side of the pivot and means for adjusting the temperature range of switch operation, independently of the thermostat comprising a carriage upon which the track is mounted for selective movement with respect to the axis of the weight.

11. In a switch of the character described, an underslung pivoted tubular track member, a wheel that is movable by thermostat controlled means to tip the pivoted track to control an electrical circuit, the said wheel being movable inside the tubular track with its axle parallel to the axis of the pivot of the tubular track.

12. A sensitive switch defined in part as a pivotally balanced top-heavy beam, an electrical contact member made fast to the beam, that is arranged to open and close an electric circuit as the beam oscillates and a rolling weight superposed on the beam, that is mounted for movement under the influence of heat sensitive means, to oscillate the beam in synchronism with changes in temperature.

13. In a thermal control switch, a pivoted track member, a switch element made rigid therewith, a wheel member, linkage connecting the wheel to a thermostat to timely tip the track to operate the switch element and a carriage mounting for the pivoted track that is movable to change the temperature range effective to cause tipping of the track.

14. In thermal control apparatus, a switch, a beam like centrally pivoted track member upon which one switch element is mounted, a weighted wheel that is movable axially of the track to tip the same and operate the switch, a thermostat that includes a part movable in proportion to temperature changes and a linkage between said movable part and the weighted wheel.

15. A thermal control switch defined in part as a pivoted tipping beam carrying one element of the switch, a carriage upon which the beam is pivotally mounted and the other switch element fixedly mounted, a wheel supported by the beam and movable therealong, the said wheel being movable by thermostatic influence in proportion to temperature change and the said carriage being movable to change the relative position of the beam pivot.

OSCAR JOEL OSTLIND.